(No Model.)
G. W. ROWE & W. G. HEYS.
PNEUMATIC TIRE.
No. 577,400. Patented Feb. 16, 1897.
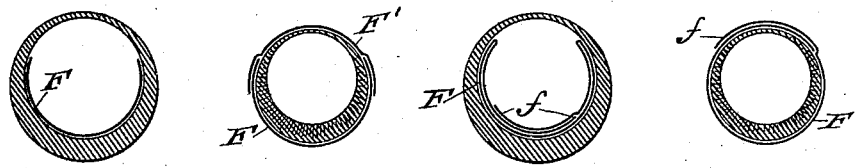
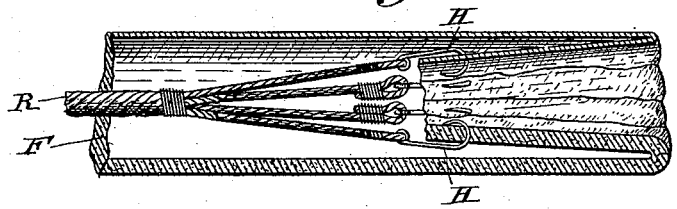
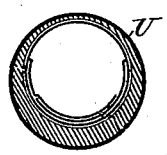 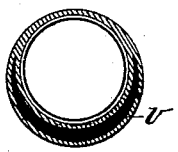 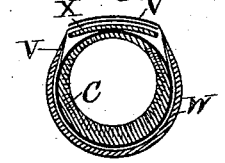
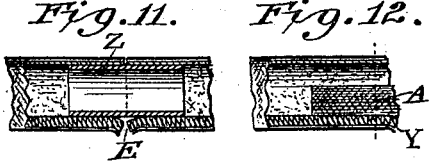
Witnesses
Inventors
George W. Rowe and
William G. Heys,
By their Attorney

UNITED STATES PATENT OFFICE.

GEORGE WILLIAM ROWE AND WILLIAM GEO. HEYS, OF MANCHESTER, ENGLAND.

PNEUMATIC TIRE.

SPECIFICATION forming part of Letters Patent No. 577,400, dated February 16, 1897.

Application filed December 24, 1891. Serial No. 416,068. (No model.) Patented in England July 17, 1891, No. 12,152; in Austria-Hungary December 17, 1891, No. 15,277 and No. 67,793; in Sweden December 19, 1891, No. 6,014; in Norway December 19, 1891, No. 2,741; in France December 23, 1891, No. 218,235; in Spain December 23, 1891, No. 12,826; in Italy December 24, 1891, LX, 476; in Switzerland December 26, 1891, No. 4,599; in Belgium December 28, 1891, No. 97,734; in Canada December 29, 1891, No. 41,296; in India January 16, 1892, No. 19; in Victoria August 18, 1892, No. 9,879; in South Australia August 18, 1892, No. 2,285, and in New South Wales August 25, 1892, No. 3,934.

*To all whom it may concern:*

Be it known that we, GEORGE WILLIAM ROWE and WILLIAM GEORGE HEYS, citizens of the United Kingdom of Great Britain and Ireland, residing at Manchester, in the county of Lancaster, England, have invented certain new and useful Improvements in Pneumatic and Similar Tires, of which the following is a specification.

This invention has been patented in the following countries: England, No. 12,152, dated July 17, 1891; France, No. 218,235, dated December 23, 1891; Belgium, No. 97,734, dated December 28, 1891; Austria-Hungary, No. 15,277 and No. 67,793, dated December 17, 1891; Sweden, No. 6,014, dated December 19, 1891; Italy, No. LX, 476, dated December 24, 1891; Norway, No. 2,741, dated December 19, 1891; Spain, No. 12,826, dated December 23, 1891; Switzerland, No. 4,599, dated December 26, 1891; Canada, No. 41,296, dated December 29, 1891; India, No. 19, dated January 16, 1892; Victoria, No. 9,879, dated August 18, 1892; New South Wales, No. 3,934, dated August 25, 1892, and South Australia, No. 2,285, dated August 18, 1892.

This invention relates to pneumatic and other similar elastic tires which contain air when in use, and its objects are to prevent leakage of the air should the tire become punctured or cut, and to strengthen the construction.

For the purposes of this invention the air-containing tube or part of the tire is constructed wholly or in part of india-rubber, india-rubber compound, or other similar soft elastic material, with that part of the tube or tire which is liable to be punctured or cut compressed or in compression. The compressed tube may be formed, or the state of compression may be produced, for example, by turning an india-rubber tube inside out, so that the originally larger diameter of the tube is brought inside, and is consequently compressed. It is preferred in all cases to employ some means for preventing the stretching of the outer part of the air-containing tube or part of the tire, and thus maintaining the state of compression in the india-rubber or similar material. This may be accomplished without interfering with the flexibility of the tire—for example, by cementing or molding a strip of canvas within the tube.

The accompanying drawings illustrate in what manner the invention may be carried into practical effect.

Figure 1 shows a rubber tube with a layer of non-stretching material cemented inside of it. Fig. 2 shows the same tube turned inside out with an extra covering. Figs. 3, 4, 5, and 6 show similar views of tubes and covers. Fig. 7 illustrates one mode of turning a tube inside out. Figs. 8 and 9 show tubes before reversal. Fig. 10 shows a tire attached to a wheel-rim. Figs. 11 and 12 show joints.

As represented in cross-section by Fig. 1, a tube is molded with an internal strip of canvas F adhering to the lower and thicker part of the tire. This part is preferably made thicker, the better to resist wear and to enable a larger mass of the india-rubber or similar material to be brought into compression. The thinner part will be adequately protected in use by the rim of the wheel. The tube thus made is then turned inside out when the total diameter of the reversed tube will be smaller than that of the original tube, as shown in Fig. 2, the greater portion of the rubber being compressed within the circumference of what was originally the inner circumference, the canvas preventing its expansion. The method which may be employed for turning the tube inside out will be hereinafter described. After the tube has been turned inside out the thinner part may be protected and strengthened by means of a separate strip of canvas F', cemented thereon. In this case and in those hereinafter described the reversed tube is smaller than the original tube, as indicated in the drawings. The difference in diameter will depend upon the mass of the india-rubber or other similar material, upon its elasticity, and upon the nature of the fabric, (when used,) but it may be taken roughly that the finished diameter will be about equal to the mean diameter of the material of the original tube or in the case of a completely canvas-lined tube a little greater than the internal diameter of the original tube.

In the tube represented in cross-section by Fig. 3 a piece of canvas is molded around about two-thirds of the inner circumference. This canvas F has two flaps $f$, which after the tube has been turned inside out are cemented, the first upon the bare portion of the tube and the second upon the first, as indicated by Fig. 4, which represents a cross-section of the reversed and finished tube. In Fig. 5 is represented in cross-section a modified form of the original tube, having a tube of canvas molded around the whole of its inner circumference. The modified shape of the tube is intended only to give greater protection right up to the edge of the rim of the wheel. When this tube has been turned inside out, it will have the form indicated in cross-section by Fig. 6, the canvas F being now outside.

A convenient method which may be adopted for turning the tubes inside out is illustrated by the longitudinal section, Fig. 7. A rope R, having a few hooks H secured to it by its strands or by short cords or wires, is passed down the inside of the tube, and the hooks are engaged at about equal distances from each other to the end of the tube. The end may now be tucked into the bore of the tube, which may then be turned completely inside out with ease by holding the tube and at the same time pulling the rope R. A little powdered French chalk sprinkled within the tube will facilitate the turning.

The original tube, such as that described with reference to Figs. 5 and 6, and any of the tubes or strips from which the tubes are formed, instead of being made from a homogenous india-rubber mixture, may be constructed with two or more layers of india-rubber of different degrees of hardness or vulcanization, or with vulcanized and unvulcanized (or raw) india-rubber. For example, as illustrated by Fig. 8, a layer of raw or of soft vulcanized india-rubber U may be formed upon the tube or within the substance of the tube, as illustrated by Fig. 9. This soft india-rubber will tend to more completely close up any puncture or cut which may be made in the tire.

It will be understood that if the tire is punctured or cut while inflated the compressed condition of the india-rubber will cause it to close up the perforation and prevent the escape of the contained air, and the unvulcanized rubber, if used, will seal the hole.

The tube of compressed india-rubber, or in which the india-rubber is wholly or partly in a state of compression, may be fixed upon the rim of the wheel in practically the same manner and by the same means as those adopted at present in similarly fixing ordinary pneumatic tires. Thus in Fig. 10, which shows the tire and rim in cross-section, the tube of compressed india-rubber C is attached to the rim by a piece of cloth V, completely encircling the tube and rim, as shown, or by means of flaps attached to or woven with the canvas tube incorporated with the rubber. The tube and connecting-piece or flaps are then covered with a piece of india-rubber W, which forms the tread, and coming into contact with the ground prevents destruction of the cloth. If desired, the tread may be formed with cloth flaps for attaching to the rim, the air-tube in this case being secured to the rim by the tread. In the method illustrated in Fig. 10 the compressed air-tube, the encircling cloth, and the tread are all firmly cemented together.

It will be found that the ends of the reversed or compressed tubes splay outward to a small extent, as indicated at E, Fig. 11, which is a longitudinal section of the ends of the tube brought together for the purpose of making the joint. These ends may be brought together, so as to make a flush-joint, by means of a few stitches of stout thread passing through the canvas, or a fair butt-joint may be made by first cementing a short lining-piece of cloth A into each end of the tube, as indicated by Fig. 12, and then cutting off the end of the compressed tube along the line Y with a sharp wetted knife. The joint between the two ends of the tube may be made air-tight by means of a short india-rubber lining-tube Z, which enters both ends, and the tightness of the joint secured by cement.

It is arranged in all cases that nothing can puncture or cut into the air-space of the tire without passing through the compressed india-rubber or other similar soft elastic material.

Having now particularly described and ascertained the nature of our said invention and in what manner the same is to be performed, we declare that what we claim is—

1. A pneumatic tire having in its deflated condition a tubular cylindrical shape, with an outer layer of non-stretching material, and an inner layer of thick rubber in a state of inwardly-progressive compression.

2. A pneumatic tire composed of an annular tube of rubber in a state of inwardly-progressive compression sufficient to prevent the escape of gas through a puncture, said tire having in its deflated condition a tubular cylindrical shape, substantially as shown and described and for the purpose set forth.

3. A pneumatic tire composed of an annular tube of rubber in a state of inwardly-progressive compression, and an inclosing jacket of non-stretching material, said tire having in its deflated condition a tubular cylindrical shape, substantially as shown and described and for the purpose set forth.

4. A pneumatic tire consisting of an annular tube containing air under pressure and comprising a layer of rubber of which the portion liable to puncture is in a state of compression, sufficient to prevent the escape of air when said rubber is punctured, said tire having in its deflated condition a tubular cylindrical shape, substantially as shown and described and for the purpose set forth.

5. A pneumatic tire consisting of a rubber tube, in a state of compression, and an inclosing cover of non-stretching material cemented to the tube and having a flap or flaps continuous with the cover and cemented thereto to form a reinforce, substantially as described.

6. A pneumatic tire consisting of a rubber tube thicker on one side than on the other, a cover of non-stretching material maintaining said tube in a compressed state, and a layer of soft rubber lying on the thicker side of the tube, substantially as described.

In testimony that we claim the foregoing as our invention we have signed our names, in presence of two witnesses, this 28th day of November, 1891.

GEORGE WILLIAM ROWE.
WILLIAM GEO. HEYS.

Witnesses:
WM. E. HEYS,
ARTHUR WILLIAM PULMAN.